(12) United States Patent
Pott et al.

(10) Patent No.: US 7,086,221 B2
(45) Date of Patent: Aug. 8, 2006

(54) METHOD FOR INCREASING AN EXHAUST GAS TEMPERATURE OF A SPARK-IGNITION, DIRECT INJECTION INTERNAL COMBUSTION ENGINE

(75) Inventors: Ekkehard Pott, Gifhorn (DE); Eric Bree, Wolfsburg (DE); Kai Philipp, Lagesbüttel (DE); Michael Zillmer, Sickte (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 69 days.

(21) Appl. No.: 10/471,640

(22) PCT Filed: Feb. 22, 2002

(86) PCT No.: PCT/EP02/01938

§ 371 (c)(1),
(2), (4) Date: Apr. 2, 2004

(87) PCT Pub. No.: WO02/075137

PCT Pub. Date: Sep. 26, 2002

(65) Prior Publication Data

US 2004/0159093 A1 Aug. 19, 2004

(30) Foreign Application Priority Data

Mar. 15, 2001 (DE) ............... 101 14 054

(51) Int. Cl.
*F01N 3/00* (2006.01)
(52) U.S. Cl. ............... 60/285; 60/274; 60/284; 123/300; 123/305; 123/406.47
(58) Field of Classification Search ......... 60/274, 60/285, 286, 284; 123/300, 299, 305, 406.47, 123/406.26, 435, 436
See application file for complete search history.

(56) References Cited

U.S. PATENT DOCUMENTS 5,975,046 A * 11/1999 Kaneko et al. ............. 123/300

(Continued)

FOREIGN PATENT DOCUMENTS

DE 36 34 509 A1 4/1987

(Continued)

OTHER PUBLICATIONS

German Search Report dated Apr. 2, 2004 for application No. 101 14 054.1.

*Primary Examiner*—Binh Q. Tran
(74) *Attorney, Agent, or Firm*—Norris, McLaughlin & Marcus, PA

(57) ABSTRACT

The invention relates to a method for at least temporarily increasing an exhaust gas temperature of a spark-ignition, direction injection internal combustion engine (10) involving at least one measure, which is executed by the engine, whereby this at least one measure consists of a spark retarding and of a multiple injection (ME). During the multiple injection (ME), at least two fuel injections into the cylinder (12) are carried out within an induction cycle and compression cycle of a cylinder (12) of the internal combustion engine (10), and the latest of these injections ensues during a compression cycle of the cylinder (12). The invention also relates to the utilization of the method. According to the invention, a control end of an injection angle ($\alpha_{EE}$) of the latest injection is at least temporarily set to between 80 and 10° before an upper ignition dead center (ZOT) when operating with multiple injection and/or an ignition angle ($\alpha_Z$) is at least temporarily set to between 10 and 45° after the upper ignition dead center (ZOT) also when operating with multiple injection. A combination of both measures enables a dramatic acceleration of the warming up of a catalytic converter (16) that is connected downstream from the internal combustion engine (10).

20 Claims, 3 Drawing Sheets

U.S. PATENT DOCUMENTS

Figure 1:
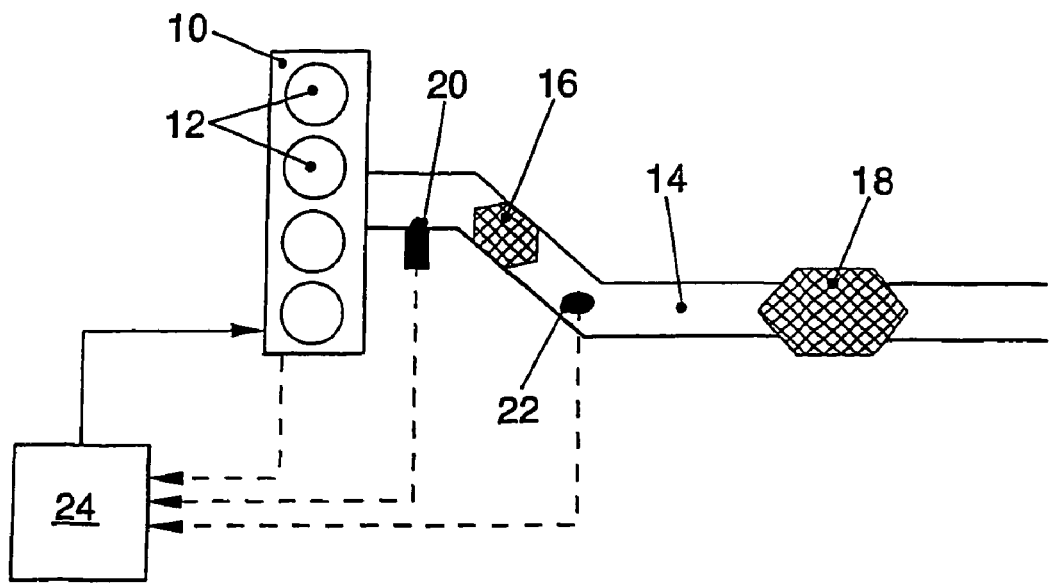

| | | | |
|---|---|---|---|
| 6,269,634 B1 * | 8/2001 | Yokota et al. | 60/286 |
| 6,397,817 B1 * | 6/2002 | Yoshida et al. | 123/406.47 |
| 6,651,617 B1 * | 11/2003 | Sukegawa et al. | 123/305 |
| 6,708,668 B1 * | 3/2004 | Yoshida et al. | 123/295 |
| 6,761,147 B1 * | 7/2004 | Majima | 123/399 |

FOREIGN PATENT DOCUMENTS

| | | |
|---|---|---|
| DE | 40 20 298 C2 | 1/1991 |
| DE | 40 14 952 A1 | 11/1991 |
| DE | 43 27 218 A1 | 2/1995 |
| DE | 196 42 653 C1 | 1/1998 |
| DE | 197 51 887 A1 | 7/1999 |

* cited by examiner

- - - - EE, $\alpha_z$= 10° after U.D.C.
———— ME, $\alpha_z$= 10° after U.D.C. , $\alpha_{EE}$ = 70° before U.D.C.
———— ME, $\alpha_z$= 30° after U.D.C. , $\alpha_{EE}$ = 40° before U.D.C.

METHOD FOR INCREASING AN EXHAUST GAS TEMPERATURE OF A SPARK-IGNITION, DIRECT INJECTION INTERNAL COMBUSTION ENGINE

The invention relates to a method for at least temporarily increasing an exhaust gas temperature of a spark-ignition, direct injection internal combustion engine as well as a use of the method.

It is desirable under certain operating conditions to increase a combustion or exhaust gas temperature of an internal combustion engine, in particular after an engine cold start, when catalysts connected downstream of the internal combustion engine have not yet reached their operating temperature. The catalysts must be warmed up to at least a catalyst-specific start or light-off temperature in order to maintain their readiness for service. The term start temperature hereby refers to a temperature where the catalyst has a conversion efficiency of 50%. Until the time after an engine cold start when the catalyst has reached its start temperature, pollutants in the exhaust gas can enter the atmosphere essentially unconverted. Several strategies are known for increasing an exhaust temperature and thereby accelerating catalyst warm-up.

It is known to retard an ignition angle, i.e., the time when an air-fuel mixture in a cylinder is ignited, during the warm-up stage relative to an ignition angle that provides the highest efficiency. Retardation of the ignition angle reduces the efficiency of the combustion while simultaneously increasing an exhaust gas temperature. The hotter exhaust gas causes the catalysts to heat up faster. The method of retarding ignition reaches its limits at ignition angles where the internal combustion engine begins to run unacceptably rough and reliable ignition can no longer be guaranteed.

Another method for increasing the exhaust gas temperature includes a so-called multiple injection which has been recently described for direct-injection, spark-ignition internal combustion engines, where the fuel is injected directly by injection valves into a combustion chamber of a cylinder (WO 00/08328, EP 0 982 489 A2, WO 00/57045). In this case, a total fuel quantity to be supplied during an operating cycle of a cylinder is divided into two parts and supplied in two injection processes to the combustion chamber of the cylinder. A first early injection (homogeneous injection) takes place during an intake stroke of the cylinder such that the injected fuel quantity is at the following ignition time at least substantially homogeneously distributed in the combustion chamber. On the other hand, a second late injection (stratified injection) is carried out during a following compression stroke, in particular during the second half of the compression stroke, leading to a so-called stratified charge where the injected fuel cloud is essentially concentrated in the region surrounding a spark plug of the cylinder. Accordingly, multiple injection operation of the internal combustion engine involves a mixed operation of stratified charging and homogeneous charging. The particular ignition characteristic of the multiple injection operation results in an increased exhaust gas temperature as compared to an entirely homogeneous operation. In addition to increasing the exhaust gas temperature, multiple injection advantageously also reduces raw emission of nitric oxides $NO_x$ and unburned hydrocarbons HC, which reduces pollutant breakthrough during the warm-up phase.

Published results from multiple injection experiments have shown that although multiple injection operation tends to significantly increase the exhaust gas temperature compared to single-injection operation, no significant temperature difference between the two operating modes is observed during the first 12 to 15 seconds following engine start.

It is therefore an object of the invention to provide a method for increasing an exhaust gas temperature which, in particular during the first 15 seconds after engine start, results in a significant temperature increase compared to conventional strategies.

According to the invention, in multiple injection operation a control end of an injection angle of the latest injection is at least temporarily set between 80 and 10° before an upper dead center (U.D.C.) and/or an ignition angle is set at least temporarily between 10 and 45° after U.D.C. The claimed ranges of the injection angle and ignition angle are located, as compared with conventional methods, in extremely late phases of an operating range of the cylinder. In this way, exhaust gas temperatures can be produced that far exceed those attained with conventional methods. In particular, a fast warm-up of at least; a first catalyst located downstream can be achieved in less than 15 seconds after the end of the engine start, while reducing emission of pollutants.

Advantageously, it is provided to simultaneously adjust both the control end of the injection angle of the latest injection as well as the ignition angle within the aforementioned crankshaft ranges. In this way, specifically late points for injection and ignition can be implemented in these ranges while achieving maximal exhaust gas temperatures.

According to a particular advantageous feature of the invention, the control end of the injection angle of the injection is set between 45 and 25° before U.D.C., in particular between 40 and 35° before U.D.C. Preferred angles for the ignition point are between 20 and 45° after U.D.C., in particular between 25 and 35° after U.D.C.

Advantageously, an angular spacing between the control end of the injection angle of the late injection and the ignition angle is set between 50 and 80°, in particular between 60 and 70°. The aforedescribed values apply to an engine rotation speed in the range between 1000 and 1500 $min^{-1}$. Preferably, the angular spacing is varied depending on the engine rotation speed and/or the injection pressure, whereby the spacing is typically increased with increasing engine rotation speed and decreased with increasing injection pressure. This embodiment ensures that the time interval for processing the mixture is always optimized.

Moreover, the multiple injection can include two injections, whereby a first, early injection occurs essentially during an intake stroke, in particular during a first half of the intake stroke. Due to the large time interval between the injection time of the early injection and the ignition point, the fuel supplied during the early injection has an essentially homogeneous distribution in the combustion chamber of the cylinder at the time of ignition. On the other hand, the second, late injection preferably occurs during the second half of the compression stroke and forms at the time of ignition a charge cloud that is located essentially in the region of a spark of the combustion chamber. The generation of such a stratified charge is generally known from stratified internal combustion engines, whereby the formation and control of the stratified charge can be accomplished with a suitably shaped piston head as well as with design measures that affect the flow characteristic in an air inlet line, for example in the form of charge deflection plates. The first case is referred to as swirl-type stratified charge operation, whereas the latter case is referred to as tumble-type operation. The present method is preferably used in internal combustion engines where the stratified charge operation is maintained by a combination of swirl and tumble gas flows.

In this way, well-defined and easily ignitable and combustible charge clouds can be reliably generated. The method has proven particularly effective for stratified internal combustion engines which operate with an air flow in the combustion chamber that has in particular a twist axis that extends perpendicular to the piston motion.

As already mentioned above, such mixed fuel processing (homogeneous/stratified) results in an increase of the exhaust gas temperature and simultaneously in a decrease of a raw emission of unburned hydrocarbons and nitric oxides. The fuel fractions of the two injections are preferably selected so that the first injection (homogeneous injection) results in a very lean air-fuel mixture that cannot be ignited by itself, but instead can only be ignited and burned with the help of the stratified charge cloud of the second injection (stratified injection). To ensure complete combustion of the homogeneous charge, the fuel quantity supplied during the homogeneous injection should not be less than 20% of the total supplied fuel quantity. Preferably, the fraction of the fuel injected during the stratified injection is at least 60%, in particular at least 70%. In addition, a slightly lean to stoichiometric air-fuel mixture with a lambda-value between 1 and 1.2 is preferably set. This takes advantage of the fact that a startup temperature of the catalyst in a lean exhaust gas atmosphere is always lower than in a stoichiometric atmosphere.

The method of the invention for increasing the exhaust gas temperature is used preferably for heating at least one catalyst connected downstream of the internal combustion engine, in particular after an engine start. Preferably, the method is used to bring a pre-catalyst installed close to the engine at least approximately to its startup temperature. For this purpose, a temperature of the catalyst can be measured and/or modeled so as to determine the duration and the strength of the heating measures, in particular a preset injection angle and ignition angle. Alternatively, the temperature of the catalyst can be determined based on an elapsed time after an engine start and/or a number of crankshaft revolutions since an engine start and/or an exhaust gas heat flow accumulated since an engine start. For this purpose, characteristic diagrams can be stored in an engine controller.

Additional advantageous embodiments of the invention are described by the features recited in the dependent claims.

Figure 4:
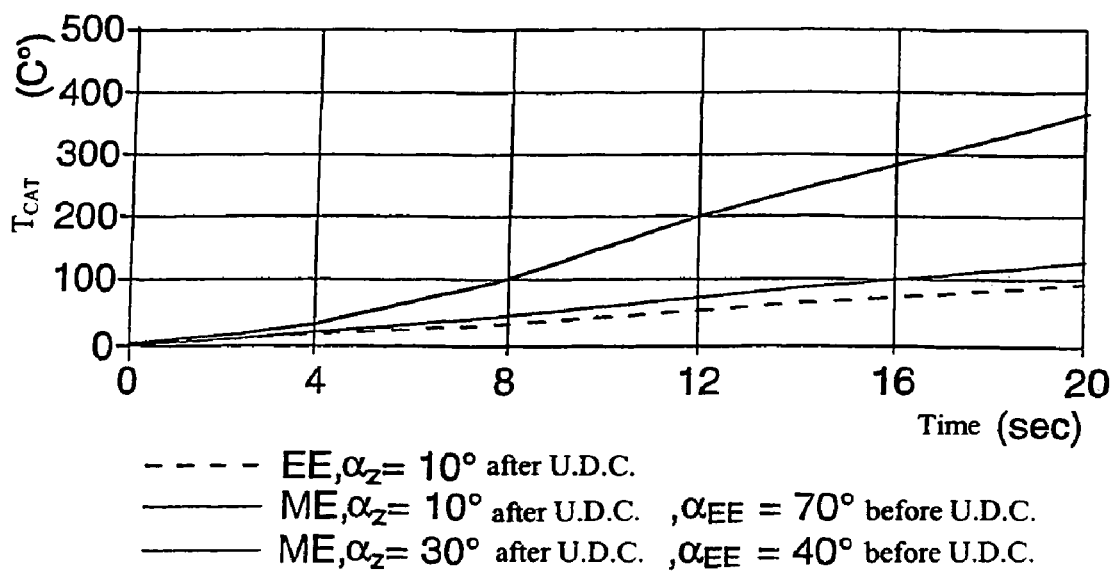
Figure 2:
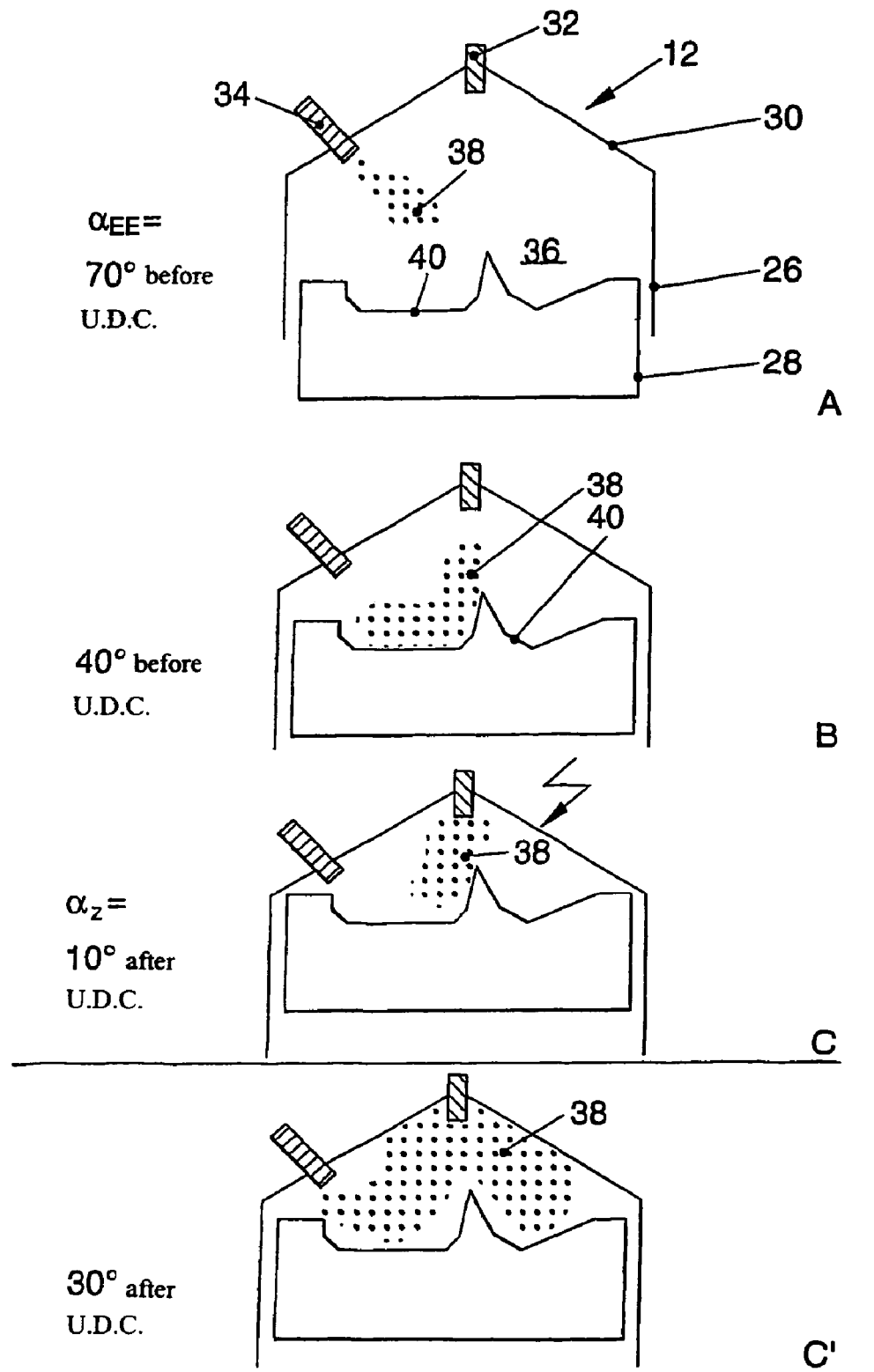
Figure 3:
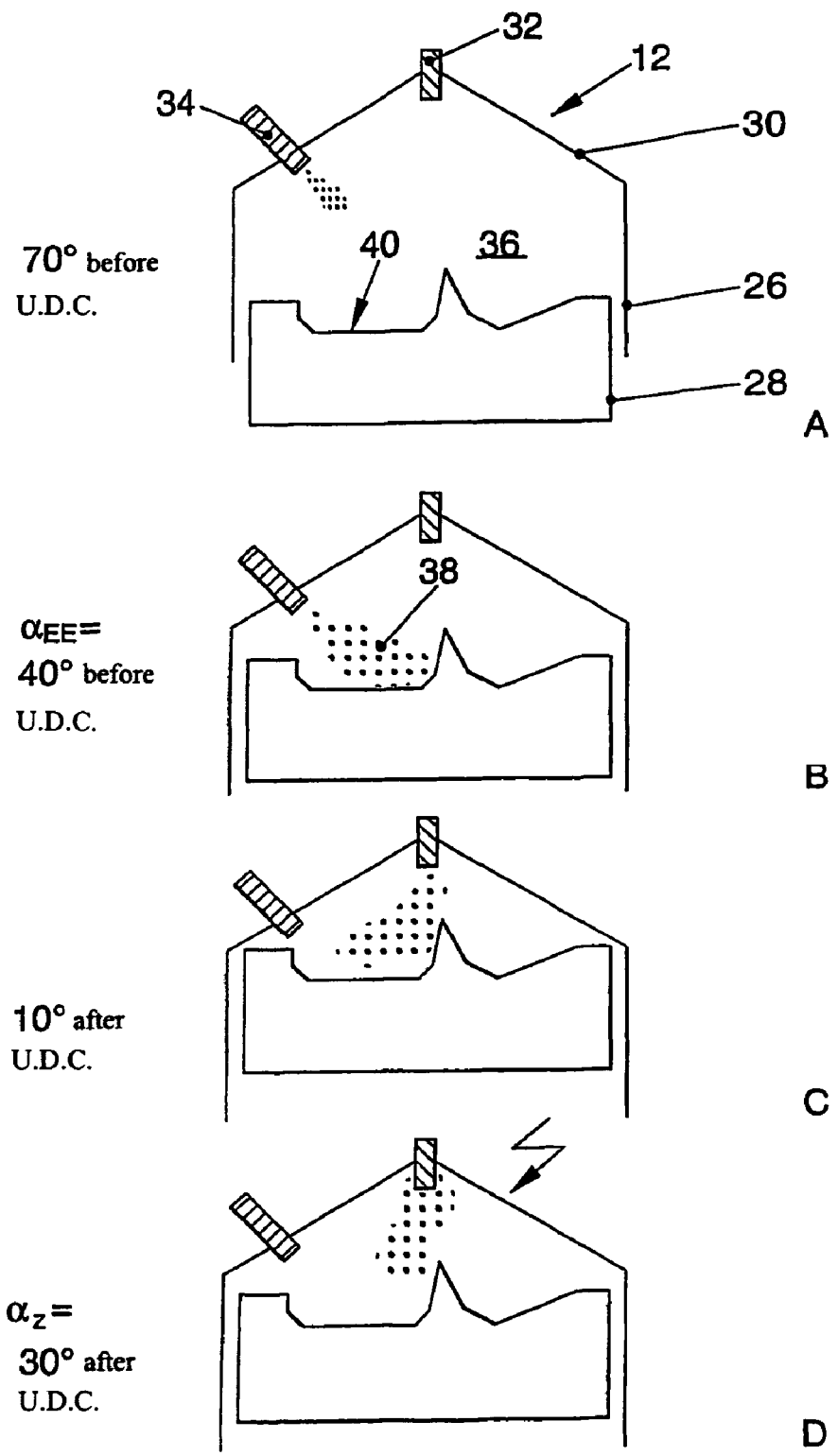

Exemplary embodiments of the invention will be described in greater detail hereinafter with reference to the appended drawings. It is shown in:

FIG. 1 schematically, an internal combustion engine with a catalyst system arranged downstream;

FIG. 2 from top to bottom, a temporal diagram of a second, late fuel injection and an ignition in multiple injection mode operating according to a conventional method;

FIG. 3 a temporal diagram of fuel injection and ignition according to an advantageous embodiment of the method of the invention; and FIG. 4 temporal diagrams of a catalyst temperature following an engine cold start according to different strategies for increasing an exhaust gas temperature.

FIG. 1 shows a spark-ignition internal combustion engine 10 capable of running in a lean operating mode, which includes for example four cylinders 12. The internal combustion engine 10 has a direct injection system (not shown) capable of injecting fuel directly into the cylinders 12. An exhaust gas produced by the internal combustion engine 10 passes through an exhaust channel 14 and the catalyst system 16, 18 located in the exhaust channel 14. The catalyst system includes a pre-catalyst 16 with a small volume located close to the engine, as well as a main catalyst 18, for example an $NO_x$ storage catalyst, which is typically located under the floor. The air-fuel ratio supplied to the internal combustion engine 10 is regulated by measuring an oxygen concentration of the exhaust gas using a lambda-sensor 20. A temperature sensor 22, which is located downstream of the pre-catalyst 16 in the exhaust channel 14, enables measurement of the exhaust gas temperature so that conclusions about the temperature of the pre-catalyst and/or the main catalyst 16, 18 can be drawn. The signals supplied by the sensors 20, 22 as well as various operating parameters of the internal combustion engine 10 are transmitted to an engine controller 24 for processing according to stored algorithms and characteristic curves. The internal combustion engine 10, and in particular the air-fuel ratio, the injection mode and the ignition, are controlled by the engine controller 24 depending on these signals.

If the temperature sensor 22 determines that a temperature of the catalyst system, in particular of the pre-catalyst 16, is less than a startup temperature required for adequate pollutant conversion, for example after an engine cold start, then the engine controller 24 initiates various measures for increasing the exhaust gas temperature. In particular, the operation of the internal combustion engine 10 is switched from single injection to multiple injection. A first early injection occurs, preferably within the first half of the intake stroke of a cylinder 12, so that the fuel supplied during this injection has at a subsequent ignition point a substantially homogeneous distribution in the combustion chamber (homogeneous injection). A second, late fuel injection (stratified injection) occurs with a control end which at engine rotation speeds at 1000 and 1500 $min^{-1}$ lies at least temporarily between 80 and 10° before the upper dead center (U.D.C.), i.e., in the second half of a compression stroke. Simultaneously, an ignition angle of 10 to 45° after U.D.C. is set at least temporarily in multiple injection operation at engine rotation speeds of 1000 and 1500 $min^{-1}$. The particular combustion processes of the multiple injection operation as well as the extreme late ignition result in an increase of the exhaust gas temperature and hence an accelerated warm-up of the catalyst system 16, 18.

FIG. 2 shows schematically the sequential events of the late stratified injection and ignition during a compression stroke of a cylinder according to a conventional process. The cylinder designated with the reference numeral 12 includes a cylinder housing 26 and a piston 28 disposed for axial movement therein. A spark plug 32 is located at a central location of a cylinder head 30. A fuel injection valve 34 which injects fuel directly into the combustion chamber 36 of the cylinder 12 is arranged on the side of the cylinder head 30. For the sake of simplicity, air inlet and outlet channels located also in the cylinder head 30 are not shown. According to the conventional method, an end of the late stratified injection is controlled with an injection angle $\alpha_{EE}$ of typically 70° before U.D.C. This point in time is indicated in the upper part A of FIG. 2, whereby the reference numeral 38 indicates the charge cloud just introduced into the combustion chamber 36. The charge cloud 38 is still near the injection valve 34 and has a relatively large spacing to a piston head 40 of the upwardly moving piston 28.

When the operating cycle of the cylinder 12 continues, the charge cloud 38 and the piston 28 move towards each other. At a crankshaft angle of 40° before U.D.C. (FIG. 2B), the charge cloud 38 has already moved away from the injection valve 34 and reached a trough machined into the piston head 40. As a result of the special configuration of the piston head 40, the charge cloud 38 is diverted towards the spark plug 32. This movement of the charge can be further supported by particularly advantageous airflow conditions in the combustion chamber 36.

Part C of the Figure shows the piston position and charge conditions at an ignition time $\alpha_Z$ of 10° after U.D.C., which in conventional processes represents the latest possible ignition time for a low-HC operation without misfiring. Although the exhaust gas temperature can be increased by the aforedescribed method, only a very small heating effect on the catalysts 16, 18 is observed during the first 12 to 10 seconds after engine start, as will be described below with reference to FIG. 4. The lower part C' of FIG. 2 shows that a later ignition time, for example 30° after U.D.C., is impractical, since at that time the charge cloud 38 has already spread out considerably in the combustion chamber 36 and has therefore become much leaner, i.e., has less fuel. This results in poor ignition characteristics with a high misfiring rate and a high HC raw emission.

According to the invention, the injection angle $\alpha_{EE}$ as well as the ignition angle $\alpha_Z$ are set to much later times. A corresponding curve is shown in FIG. 3. The same reference numerals indicate identical elements as in FIG. 2 and will therefore not be described again. At a point 70° before U.D.C., injection of the late stratified injection of the multiple injection operation is still in its initial phase (FIG. 3 A). According to the invention, the control end $\alpha_{EE}$ of the stratified injection occurs at a very late time, in this example at 40° before U.D.C. (FIG. 3B). At this point, the charge cloud 38 that is just leaving the injection valve 34 already reaches the piston head 40 located close by.

When the operating cycle continues, the charge cloud 38 passes through the trough of the piston head 40 to the spark plug 32. Unlike conventional processes, the charge cloud 38 has at 10° after U.D.C. not yet or only barely reached the spark plug, so that an ignition at this point in time is either not yet possible at all or not yet optimized (FIG. 3C). Ignition occurs when the piston 28 is again moving upward, in particular at an ignition angle of 20 to 35° after U.D.C., preferably 30° after U.D.C. (FIG. 3 bottom). Particularly late ignition times and the hence particularly high exhaust gas temperatures can be achieved in combustion processes where the stratified charge cloud 38 is formed and controlled through a special configuration of the piston head, i.e., with a swirl-type gas flow, as well as by suitable airflow patterns generated by suitable designs of the air inlet channel (tumble gas flow). In particular, suitable airflow patterns to be used in conjunction with the method of the invention have a twist axis that extends preferably transversely to the piston motion. By processing the mixture in this way, the ignitable mixture cloud 38 is maintained in the region of the spark plug for a long time, enabling particularly late ignition angles $\alpha_Z$.

Results of the different strategies for accelerating a catalyst warm-up are compared in FIG. 4. FIG. 4 shows curves of a catalyst temperature $T_{Cat}$ of the pre-catalyst 16 after an engine start, whereby the pre-catalyst 16 is located approximately 30 mm downstream of the 2.0-liter internal combustion engine 10 with direct injection. The catalyst temperature $T_{Cat}$ is determined at a temperature measurement location located approximately in the center in the pre-catalyst 16 about 20 mm downstream of a surface exposed to the flow. In conventional single injection EE and a purely homogeneous operation and an ignition angle $\alpha_Z$ of 10° after U.D.C., the catalyst temperature $T_{Cat}$ of the pre-catalyst 16 reaches approximately 50 after 12 seconds (broken line). With the conventional method depicted in FIG. 2, i.e., with multiple injection ME with an injection end of the stratified injection $\alpha_{EE}$ of 70° before U.D.C. and an ignition angle $\alpha_Z$ of 10° after U.D.C, the pre-catalyst 16 reaches a temperature of approximately 65° C. after 12 seconds This clearly indicates that the conventional multiple injection operation at least during the first seconds after engine start results in only a small temperature increase compared to the single injection operation. Conversely, with the method of the invention exemplified in the embodiment depicted in FIG. 3, i.e., an injection end $\alpha_{EE}$ of 40° before U.D.C. and an ignition angle of $\alpha_Z$ of 30° after U.D.C., a catalyst temperature $T_{Cat}$ of 200° C. is reached after 12 seconds. This clearly indicates that in particular a combination of late injection and late ignition causes the catalyst to heat up significantly faster, resulting in a significant reduction in the emission of pollutants.

LIST OF REFERENCE NUMERALS 10 internal combustion engine
12 cylinder
14 exhaust gas channel
16 pre-catalyst
18 main catalyst/$NO_x$ storage catalyst
20 lambda sensor
22 temperature sensor
24 engine controller
26 cylinder housing
28 piston
30 cylinder head
32 spark plug
34 injection valve
36 combustion chamber
38 charge cloud
40 piston head
$\alpha_Z$ ignition angle
$\alpha_{EE}$ control end stratified injection
EE single injection
ME multiple injection
$T_{Cat}$ pre-catalyst temperature
U.D.C. upper dead center

The invention claimed is:

1. Method for at least temporarily increasing an exhaust gas temperature of a spark-ignition, direct-injection internal combustion engine through at least one engine-related measure, wherein the at least one engine-related measure includes retarding an ignition angle and a multiple injection (ME), and wherein during the multiple injection (ME) at least two fuel injections into the cylinder are carried out during an intake stroke and compression stroke of a cylinder of the internal combustion engine and the latest of these injections occurs during the a compression stroke of the cylinder, wherein the method comprises:

in multiple injection operation, simultaneously temporarily setting a control end of an injection angle ($\alpha_{EE}$) of the latest injection between 80 and 10° before an upper dead center (U.D.C.) and an ignition angle ($\alpha_Z$) between 10 and 45° after U.D.C.

2. Method according to claim 1, characterized in that the control end of the injection angle ($\alpha_{EE}$) of the latest injection is at least temporarily set between 45 and 25° before the upper dead center (U.D.C.).

3. Method according to claim 1, characterized in that the ignition angle ($\alpha_Z$) is set between 20 and 45° after U.D.C.

4. Method according to claim 1, characterized in that an angular spacing between the injection end ($\alpha_{EE}$) of the late injection and the ignition angle ($\alpha_Z$) is varied depending on at least one of an engine rotation speed and an injection pressure.

5. Method according to claim 1, characterized in that the multiple injection (ME) includes two injections, wherein the first, early injection occurs essentially during an intake stroke, and the fuel supplied during the early injection has at the time of ignition an essentially homogeneous distribution in the combustion chamber of the cylinder.

6. Method according to claim 5, characterized in that the second, late injection occurs during the second half of the compression stroke and the fuel supplied during the late injection is at the time of ignition essentially concentrated in the region of a spark plug of the combustion chamber of the cylinder.

7. Method according to claim 1, characterized in that the internal combustion engine is charged in a stratified manner, wherein the stratified charge operation is of at least one of a tumble-type and a swirl-type.

8. Method according to claim 1, characterized in that an airflow in the combustion chamber of the internal combustion engine has a twist axis.

9. Method according to claim 1, characterized in that a fraction of the fuel injected during the late injection of a total injected fuel quantity is at least 60%.

10. Method according to claim 1 for heating at least one catalyst connected downstream of the internal combustion engine.

11. Method according to claim 10, characterized in that a temperature ($T_{cat}$) of the catalyst is at least one of measured and modeled.

12. Method according to claim 11, characterized in that a temperature ($T_{cat}$) of the catalyst is determined based on at least one of an elapsed time after the engine start, a number of crankshaft revolutions since the engine starts, a distance traveled since the engine start and a cumulative exhaust heat flow.

13. Method according to claim 2, characterized in that the control end of the injection angle ($\alpha_{EE}$) of the latest injection is at least temporarily set between 40 and 35° before the U.D.C.

14. Method according to claim 3, characterized in that the ignition angle ($\alpha_Z$) is set between 25 and 35° after U.D.C.

15. Method according to claim 4, characterized in that an angular spacing between the injection end ($\alpha_{EE}$) of the late injection and the ignition angle ($\alpha_Z$) is increased with increasing engine rotation speed and decreased with increasing injection pressure.

16. Method according to claim 5, wherein the first, early injection occurs essentially during a first half of the intake stroke.

17. Method according to claim 8, wherein the twist axis extends perpendicular to piston motion.

18. Method according to claim 9, wherein the fraction of the fuel injected during the late injection of the total injected fuel quantity is at least 70%.

19. Method for at least temporarily increasing an exhaust gas temperature of a spark-ignition, direct-injection internal combustion engine through at least one engine-related measure, wherein the at least one engine-related measure includes retarding an ignition angle and a multiple injection (ME), and wherein during the multiple injection (ME) at least two fuel injections into the cylinder are carried out during an intake stroke and compression stroke of a cylinder of the internal combustion engine and the latest of these injections occurs during the compression stroke of the cylinder, wherein the method comprises:

in multiple injection operation, simultaneously temporarily setting a control end of an injection angle ($\alpha_{EE}$) of the latest injection between 80 and 10° before an upper dead center (U.D.C.) and an ignition angle ($\alpha_Z$) between 10 and 45° after U.D.C; and varying an angular spacing between the injection end ($\alpha_{EE}$) of the late injection and the ignition angle ($\alpha_Z$) depending on at least one of an engine rotation speed and an injection pressure, wherein at the engine rotation speed between 1000 and 1500 min$^{-1}$ an angular spacing between the control end of the injection angle ($\alpha_{EE}$) of the late injection and the ignition angle ($\alpha_Z$) is set between 50 and 80°.

20. Method according to claim 19, characterized in that at an engine rotation speed between 1000 and 1500 min$^{-1}$ an angular spacing between the control end of the injection angle ($\alpha_{EE}$) of the late injection and the ignition angle ($\alpha_Z$) is set between 60 and 70°.

* * * * *